(12) United States Patent
Ernst et al.

(10) Patent No.: US 8,800,285 B2
(45) Date of Patent: Aug. 12, 2014

(54) RANKINE CYCLE WASTE HEAT RECOVERY SYSTEM

(75) Inventors: Timothy C. Ernst, Columbus, IN (US); Christopher R. Nelson, Columbus, IN (US)

(73) Assignee: Cummins Intellectual Property, Inc., Minneapolis, MN (US)

(*) Notice: Subject to any disclaimer, the term of this patent is extended or adjusted under 35 U.S.C. 154(b) by 199 days.

(21) Appl. No.: 13/344,261

(22) Filed: Jan. 5, 2012

(65) Prior Publication Data

US 2012/0210713 A1    Aug. 23, 2012

Related U.S. Application Data (60) Provisional application No. 61/430,328, filed on Jan. 6, 2011, provisional application No. 61/447,433, filed on Feb. 28, 2011.

(51) Int. Cl.
  *F01K 23/10* (2006.01)
(52) U.S. Cl.
  USPC ............. 60/618; 60/616; 60/660; 60/671
(58) Field of Classification Search
  USPC ............. 60/614–618, 645, 659–660, 671
  See application file for complete search history.

(56) References Cited

U.S. PATENT DOCUMENTS

| | | | |
|---|---|---|---|
| 3,232,052 A | 2/1966 | Ricard | |
| 3,512,358 A * | 5/1970 | Schmidt | .................. 60/659 |
| 3,636,706 A * | 1/1972 | Minto | .................. 60/671 |
| 3,789,804 A | 2/1974 | Aguet | |
| 4,009,587 A | 3/1977 | Robinson et al. | |
| 4,164,850 A | 8/1979 | Lowi, Jr. | |
| 4,171,617 A * | 10/1979 | Sakamoto et al. | .................. 60/659 |
| 4,204,401 A | 5/1980 | Earnest | |
| 4,232,522 A | 11/1980 | Steiger | |
| 4,267,692 A | 5/1981 | Earnest | |
| 4,271,664 A | 6/1981 | Earnest | |
| 4,428,190 A | 1/1984 | Bronicki | |
| 4,458,493 A | 7/1984 | Amir et al. | |
| 4,581,897 A | 4/1986 | Sankrithi | |
| 4,630,572 A | 12/1986 | Evans | |
| 4,831,817 A | 5/1989 | Linhardt | |
| 4,851,897 A | 7/1989 | Inuma et al. | |
| 4,873,829 A | 10/1989 | Williamson | |

(Continued)

FOREIGN PATENT DOCUMENTS

CN    1063743 A    8/1992
CN    201095301 Y    8/2008

(Continued)

OTHER PUBLICATIONS

English Translation of Search Report for Chinese Patent Application No. 201210003995.8, dated Jan. 27, 2014, 2 pages.

(Continued)

*Primary Examiner* — Kenneth Bromberg
*Assistant Examiner* — Ngoc T Nguyen
(74) *Attorney, Agent, or Firm* — Foley & Lardner LLP (57) ABSTRACT

This disclosure relates to a waste heat recovery (WHR) system and to a system and method for regulation of a fluid inventory in a condenser and a receiver of a Rankine cycle WHR system. Such regulation includes the ability to regulate the pressure in a WHR system to control cavitation and energy conversion.

25 Claims, 4 Drawing Sheets

(56) References Cited

U.S. PATENT DOCUMENTS

| | | | |
|---|---|---|---|
| 4,911,110 A | 3/1990 | Isoda et al. | |
| 5,121,607 A | 6/1992 | George, Jr. | |
| 5,207,188 A | 5/1993 | Hama et al. | |
| 5,421,157 A | 6/1995 | Rosenblatt | |
| 5,560,210 A * | 10/1996 | Bronicki | 60/660 |
| 5,649,513 A | 7/1997 | Kanda | |
| 5,685,152 A | 11/1997 | Sterling | |
| 5,771,868 A | 6/1998 | Khair | |
| 5,806,322 A | 9/1998 | Cakmakci et al. | |
| 5,915,472 A | 6/1999 | Takikawa et al. | |
| 5,950,425 A | 9/1999 | Takahashi et al. | |
| 6,014,856 A | 1/2000 | Bronicki et al. | |
| 6,035,643 A | 3/2000 | Rosenblatt | |
| 6,055,959 A | 5/2000 | Taue | |
| 6,138,649 A | 10/2000 | Khair et al. | |
| 6,301,890 B1 | 10/2001 | Zeretzke | |
| 6,321,697 B1 | 11/2001 | Matsuda et al. | |
| 6,324,849 B1 | 12/2001 | Togawa et al. | |
| 6,393,840 B1 | 5/2002 | Hay | |
| 6,494,045 B2 | 12/2002 | Rollins, III | |
| 6,523,349 B2 | 2/2003 | Viteri | |
| 6,571,548 B1 | 6/2003 | Bronicki et al. | |
| 6,598,397 B2 | 7/2003 | Hanna et al. | |
| 6,606,848 B1 | 8/2003 | Rollins, III | |
| 6,629,413 B1 * | 10/2003 | Wendt et al. | 60/659 |
| 6,637,207 B2 | 10/2003 | Konezciny et al. | |
| 6,701,712 B2 | 3/2004 | Bronicki et al. | |
| 6,715,296 B2 | 4/2004 | Bakran et al. | |
| 6,745,574 B1 | 6/2004 | Dettmer | |
| 6,748,934 B2 | 6/2004 | Natkin et al. | |
| 6,751,959 B1 | 6/2004 | McClanahan et al. | |
| 6,792,756 B2 | 9/2004 | Bakran et al. | |
| 6,810,668 B2 | 11/2004 | Nagatani et al. | |
| 6,817,185 B2 | 11/2004 | Coney et al. | |
| 6,848,259 B2 | 2/2005 | Kelller-Sornig et al. | |
| 6,877,323 B2 | 4/2005 | Dewis | |
| 6,880,344 B2 | 4/2005 | Radcliff et al. | |
| 6,910,333 B2 | 6/2005 | Minemi et al. | |
| 6,964,168 B1 | 11/2005 | Pierson et al. | |
| 6,977,983 B2 | 12/2005 | Correia et al. | |
| 6,986,251 B2 | 1/2006 | Radcliff et al. | |
| 7,007,487 B2 | 3/2006 | Belokon et al. | |
| 7,028,463 B2 | 4/2006 | Hammond et al. | |
| 7,044,210 B2 | 5/2006 | Usui | |
| 7,069,884 B2 | 7/2006 | Baba et al. | |
| 7,117,827 B1 | 10/2006 | Hinderks | |
| 7,121,906 B2 | 10/2006 | Sundel | |
| 7,131,259 B2 | 11/2006 | Rollins, III | |
| 7,131,290 B2 | 11/2006 | Taniguchi et al. | |
| 7,159,400 B2 * | 1/2007 | Tsutsui et al. | 60/665 |
| 7,174,716 B2 | 2/2007 | Brasz et al. | |
| 7,174,732 B2 | 2/2007 | Taniguchi et al. | |
| 7,191,740 B2 | 3/2007 | Baba et al. | |
| 7,200,996 B2 | 4/2007 | Cogswell et al. | |
| 7,225,621 B2 | 6/2007 | Zimron et al. | |
| 7,281,530 B2 | 10/2007 | Usui | |
| 7,325,401 B1 | 2/2008 | Kesseli et al. | |
| 7,340,897 B2 | 3/2008 | Zimron et al. | |
| 7,454,911 B2 | 11/2008 | Tafas | |
| 7,469,540 B1 | 12/2008 | Knapton et al. | |
| 7,578,139 B2 | 8/2009 | Nishikawa et al. | |
| 7,594,399 B2 * | 9/2009 | Lehar et al. | 60/649 |
| 7,665,304 B2 | 2/2010 | Sundel | |
| 7,721,552 B2 | 5/2010 | Hansson et al. | |
| 7,797,940 B2 | 9/2010 | Kaplan | |
| 7,823,381 B2 | 11/2010 | Misselhorn | |
| 7,833,433 B2 | 11/2010 | Singh et al. | |
| 7,866,157 B2 | 1/2011 | Ernst et al. | |
| 7,942,001 B2 | 5/2011 | Radcliff et al. | |
| 7,958,873 B2 | 6/2011 | Ernst et al. | |
| 7,997,076 B2 | 8/2011 | Ernst | |
| 2002/0099476 A1 | 7/2002 | Hamrin et al. | |
| 2003/0033812 A1 | 2/2003 | Gerdes et al. | |
| 2003/0213245 A1 | 11/2003 | Yates et al. | |
| 2003/0213246 A1 | 11/2003 | Coll et al. | |
| 2003/0213248 A1 | 11/2003 | Osborne et al. | |
| 2005/0072170 A1 | 4/2005 | Taniguchi et al. | |
| 2005/0262842 A1 | 12/2005 | Claassen et al. | |
| 2008/0289313 A1 | 11/2008 | Batscha et al. | |
| 2009/0031724 A1 | 2/2009 | Ruiz | |
| 2009/0090109 A1 | 4/2009 | Mills et al. | |
| 2009/0121495 A1 | 5/2009 | Mills | |
| 2009/0133646 A1 | 5/2009 | Wankhede et al. | |
| 2009/0151356 A1 | 6/2009 | Ast et al. | |
| 2009/0179429 A1 | 7/2009 | Ellis et al. | |
| 2009/0211253 A1 | 8/2009 | Radcliff et al. | |
| 2009/0320477 A1 | 12/2009 | Juchymenko | |
| 2009/0322089 A1 | 12/2009 | Mills et al. | |
| 2010/0018207 A1 | 1/2010 | Juchymenko | |
| 2010/0071368 A1 | 3/2010 | Kaplan et al. | |
| 2010/0083919 A1 | 4/2010 | Bucknell | |
| 2010/0139626 A1 | 6/2010 | Raab et al. | |
| 2010/0180584 A1 | 7/2010 | Berger et al. | |
| 2010/0192569 A1 | 8/2010 | Ambros et al. | |
| 2010/0229525 A1 | 9/2010 | Mackay et al. | |
| 2010/0257858 A1 | 10/2010 | Yaguchi et al. | |
| 2010/0263380 A1 | 10/2010 | Biederman et al. | |
| 2010/0282221 A1 | 11/2010 | Le Lievre | |
| 2010/0288571 A1 | 11/2010 | Dewis et al. | |
| 2011/0005477 A1 | 1/2011 | Terashima et al. | |
| 2011/0006523 A1 | 1/2011 | Samuel | |
| 2011/0041505 A1 * | 2/2011 | Kasuya et al. | 60/660 |
| 2011/0048012 A1 * | 3/2011 | Ernst et al. | 60/671 |
| 2011/0094485 A1 | 4/2011 | Vuk et al. | |
| 2011/0167818 A1 * | 7/2011 | Tsuchino et al. | 60/618 |
| 2011/0209473 A1 | 9/2011 | Fritz et al. | |
| 2011/0308252 A1 * | 12/2011 | Kopecek et al. | 60/660 |
| 2012/0023946 A1 | 2/2012 | Ernst et al. | |
| 2012/0042650 A1 * | 2/2012 | Ernst et al. | 60/618 |
| 2012/0047891 A1 * | 3/2012 | Rosenfeld | 60/659 |
| 2012/0192560 A1 * | 8/2012 | Ernst et al. | 60/616 |
| 2012/0227404 A1 * | 9/2012 | Schuster et al. | 60/671 |
| 2012/0291418 A1 * | 11/2012 | Rusche | 60/618 |
| 2013/0263594 A1 * | 10/2013 | Hall | 60/671 |

FOREIGN PATENT DOCUMENTS

| | | | | |
|---|---|---|---|---|
| CN | 101566113 A | 10/2009 | | |
| EP | 1 273 785 B1 | 5/2007 | | |
| JP | 60-222511 A | 11/1985 | | |
| JP | 8-68318 A | 3/1996 | | |
| JP | 9-32653 A | 2/1997 | | |
| JP | 10-238418 A | 9/1998 | | |
| JP | 11-166453 A | 6/1999 | | |
| JP | 2005-36787 A | 2/2005 | | |
| JP | 2005-42618 A | 2/2005 | | |
| JP | 2005-201067 A | 7/2005 | | |
| JP | 2005-329843 A | 12/2005 | | |
| JP | 2008-240613 A | 10/2008 | | |
| JP | 2008231981 A * | 10/2008 | | F01K 23/06 |
| JP | 2009-133266 A | 6/2009 | | |
| JP | 2009-167995 A | 7/2009 | | |
| JP | 2009-191647 A | 8/2009 | | |
| JP | 2010-77964 A | 4/2010 | | |
| WO | 2009/098471 A2 | 8/2009 | | |
| WO | WO-2010/070786 A1 | 6/2010 | | |
| WO | WO 2010070786 A1 * | 6/2010 | | F01K 13/02 |

OTHER PUBLICATIONS

First Office Action and English Translation for Chinese Patent Application No. 201210003995.8, mail date: Feb. 8, 2014, 16 pages.

* cited by examiner

RANKINE CYCLE WASTE HEAT RECOVERY SYSTEM

CROSS-REFERENCE TO RELATED APPLICATIONS

This application claims the benefit of priority to U.S. Provisional Patent Application No. 61/430,328 filed on Jan. 6, 2011 and to U.S. Provisional Patent Application No. 61/447,433 filed on Feb. 28, 2011 which are hereby incorporated by reference in their entirety.

STATEMENT REGARDING FEDERALLY SPONSORED RESEARCH OR DEVELOPMENT

This invention was made with government support under "RANKINE CYCLE WASTE HEAT RECOVERY SYSTEM," contract number DE-FC26-05NT42419 awarded by the Department of Energy (DOE). The government has certain rights in the invention.

TECHNICAL FIELD

This disclosure relates to a waste heat recovery (WHR) system and to a system and method for regulation of a fluid inventory in a condenser, a sub-cooler, and a receiver of a Rankine cycle WHR system.

BACKGROUND

Applying a Rankine cycle, including an organic Rankine cycle, to an internal combustion engine may offer a fuel economy improvement by capturing a portion of heat energy that normally would be wasted in an internal combustion engine. However, control and operation of the system throughout an engine's transient duty cycle and through changing environments is challenging. Increasing the flexibility of operation of a WHR system may assist operation of the WHR system through an engine's duty cycle and through changing environments.

SUMMARY

This disclosure provides a waste heat recovery system for an internal combustion engine comprising a working fluid circuit and a fluid management system. The working fluid circuit contains a working fluid and includes a condenser/sub-cooler positioned along the working fluid circuit. The condenser/sub-cooler contains a liquid working fluid having a first fluid level. The working fluid circuit also includes a heat exchanger positioned along the working fluid circuit downstream of the condenser/sub-cooler. The working fluid circuit also includes an energy conversion device positioned along the working fluid circuit between the heat exchanger and the condenser/sub-cooler. The fluid management system includes a receiver containing the liquid working fluid and a transfer circuit fluidly connecting the receiver and the condenser/sub-cooler. The liquid working fluid in the receiver has a second fluid level and a minimum second fluid level is higher than a maximum first fluid level. A pump is positioned along the transfer circuit between the condenser/sub-cooler and the receiver. The waste heat recovery system includes at least one sensor adapted to measure a condition of the working fluid circuit. The waste heat recovery system includes a control module adapted to receive the condition signal from the at least one sensor and to generate a pump control signal based on the condition signal to control operation of the pump to transfer liquid working fluid between the receiver and the condenser/sub-cooler to change the first fluid level.

This disclosure also provides a waste heat recovery system for an internal combustion engine comprising a working fluid circuit and a fluid management system. The working fluid circuit contains a working fluid. The working fluid circuit includes a condenser/sub-cooler positioned along the working fluid circuit and containing a liquid working fluid having a first fluid level. The working fluid circuit includes a heat exchanger positioned along the working fluid circuit downstream of the condenser/sub-cooler. The working fluid circuit includes an energy conversion device positioned along the working fluid circuit between the heat exchanger and the condenser/sub-cooler. The fluid management system includes a receiver containing the liquid working fluid and a transfer circuit fluidly connecting the receiver and the condenser/sub-cooler. The liquid working fluid in the receiver has a second fluid level and a minimum second fluid level is higher than a maximum first fluid level. A pump is positioned along the transfer circuit between the condenser/sub-cooler and the receiver. A valve is positioned along the transfer circuit between the condenser/sub-cooler and the receiver in parallel to the pump. The waste heat recovery system comprises at least one sensor adapted to measure a condition of the working fluid circuit. The waste heat recovery system also comprises a control module adapted to receive the condition signal from the at least one sensor to generate a pump control signal and a valve control signal based on the condition signal to control operation of the pump and the valve to transfer liquid working fluid between the receiver and the condenser/sub-cooler to change the first fluid level.

This disclosure also provides a waste heat recovery system for an internal combustion engine. The waste heat recovery system comprises a working fluid circuit and a fluid management system. The working fluid circuit contains a working fluid. A condenser/sub-cooler is positioned along the working fluid circuit. The condenser/sub-cooler contains a liquid working fluid having a first fluid level. A pump is positioned along the working fluid circuit downstream of the condenser/sub-cooler. A heat exchanger is positioned along the working fluid circuit downstream of the pump. An energy conversion device is positioned along the working fluid circuit between the heat exchanger and the condenser/sub-cooler. The fluid management system includes a bypass valve positioned between the pump and the heat exchanger. The fluid management system includes a receiver containing the liquid working fluid positioned along the fluid management system downstream from the bypass valve, wherein the liquid working fluid in the receiver has a second fluid level and wherein a minimum second fluid level is higher than a maximum first fluid level. A receiver fill valve is positioned along the fluid management system between the bypass valve and the receiver. A fluid branch extends along the fluid management system from a location between the bypass valve and the receiver fill valve to the condenser/sub-cooler. A check valve having a cracking pressure and permitting flow only toward the condenser/sub-cooler is positioned along the fluid branch. An ejector positioned along the fluid branch between the check valve and the condenser/sub-cooler. A connecting passage extending along the fluid management system from a position between the receiver fill valve and the receiver to the ejector. A receiver drain valve is positioned along the connecting passage. At least one sensor adapted to measure a condition of the working fluid circuit. The waste heat recovery system also comprises a control module adapted to receive the signal from the at least one sensor to generate at least one valve control signal based on the condition signal to control operation of one or more of the bypass valve, the receiver fill valve, and the receiver drain valve to transfer liquid working fluid between the receiver and the condenser/sub-cooler to change the first fluid level.

Advantages and features of the embodiments of this disclosure will become more apparent from the following detailed description of exemplary embodiments when viewed in conjunction with the accompanying drawings.

DETAILED DESCRIPTION

Figure 1:
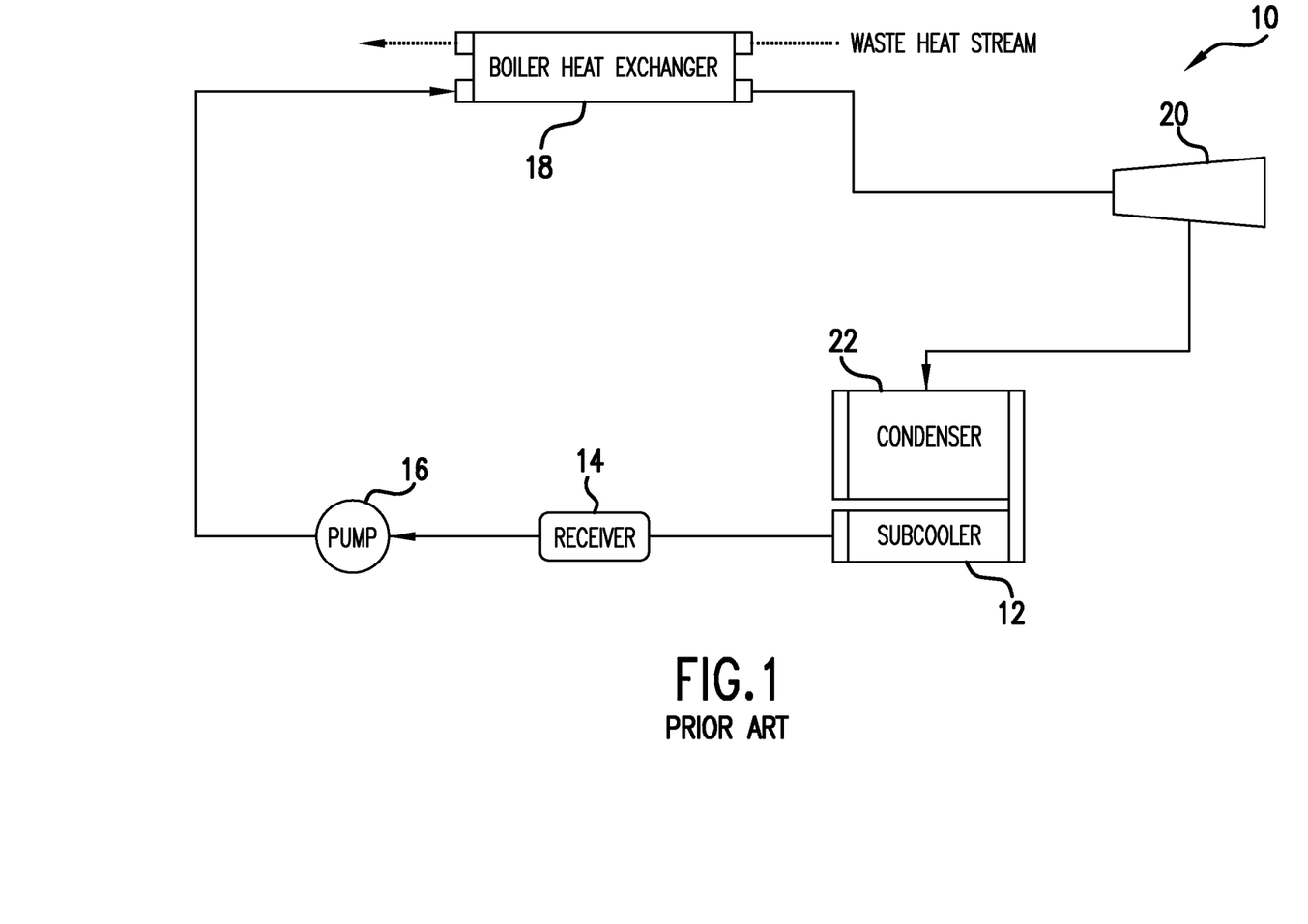
FIG. 1 is a conventional Rankine cycle WHR system.

FIG. 1 shows a conventional WHR system 10. System 10 includes a sub-cooler 12, a receiver 14 positioned downstream from sub-cooler 12, a feed pump 16 positioned downstream from receiver 14, a heat exchanger 18 positioned downstream from feed pump 16, an energy conversion device 20 positioned downstream from heat exchanger 18, and a condenser 22 positioned downstream from energy conversion device 20 and upstream from sub-cooler 12.

A liquid working fluid is located within sub-cooler 12 and receiver 14. During operation, feed pump 16 pulls liquid working fluid from receiver 14 and moves the liquid working fluid downstream to heat exchanger 18. Heat exchanger 18, which may be a single heat exchanger or multiple heat exchangers, accepts a stream of waste heat from various internal combustion engine sources (not shown). If heat exchanger 18 includes multiple heat exchangers, these heat exchangers may be in series, in parallel or a combination of series and parallel. Heat exchanger 18 may include an exhaust gas recirculation (EGR) heat exchanger, an exhaust heat exchanger, a recuperator, a pre-charge air cooler, and other internal combustion engine heat exchangers. WHR system 10 transfers heat from various internal combustion engine sources to the liquid working fluid, which causes the liquid working fluid to boil and vaporize.

The vaporized working fluid travels downstream from heat exchanger 18 to energy conversion device 20, which may be an expander turbine or other device. The vaporized working fluid cools and loses pressure during passage through energy conversion device 20. The vaporized working fluid travels downstream to condenser 22. Condenser 22 may contain a plurality of passages through which the vaporized working fluid and condensed liquid working fluid flows. A cooling medium, such as air or a fluid, flows around these passages to cause the vaporized working fluid to condense into liquid working fluid. The liquid working fluid flows downstream under the force of gravity into sub-cooler 12. The liquid working fluid may receive additional cooling in sub-cooler 12 before flowing to receiver 14, thus forming a closed loop.

The Rankine cycle working fluid may be a non-organic or an organic working fluid. Some examples of the working fluid are Genetron® R-245fa from Honeywell, Therminol®, Dowtherm J™ from Dow Chemical Co., Fluorinol® from American Nickeloid, toluene, dodecane, isododecane, methylundecane, neopentane, octane, water/methanol mixtures, and steam.

Figure 2:
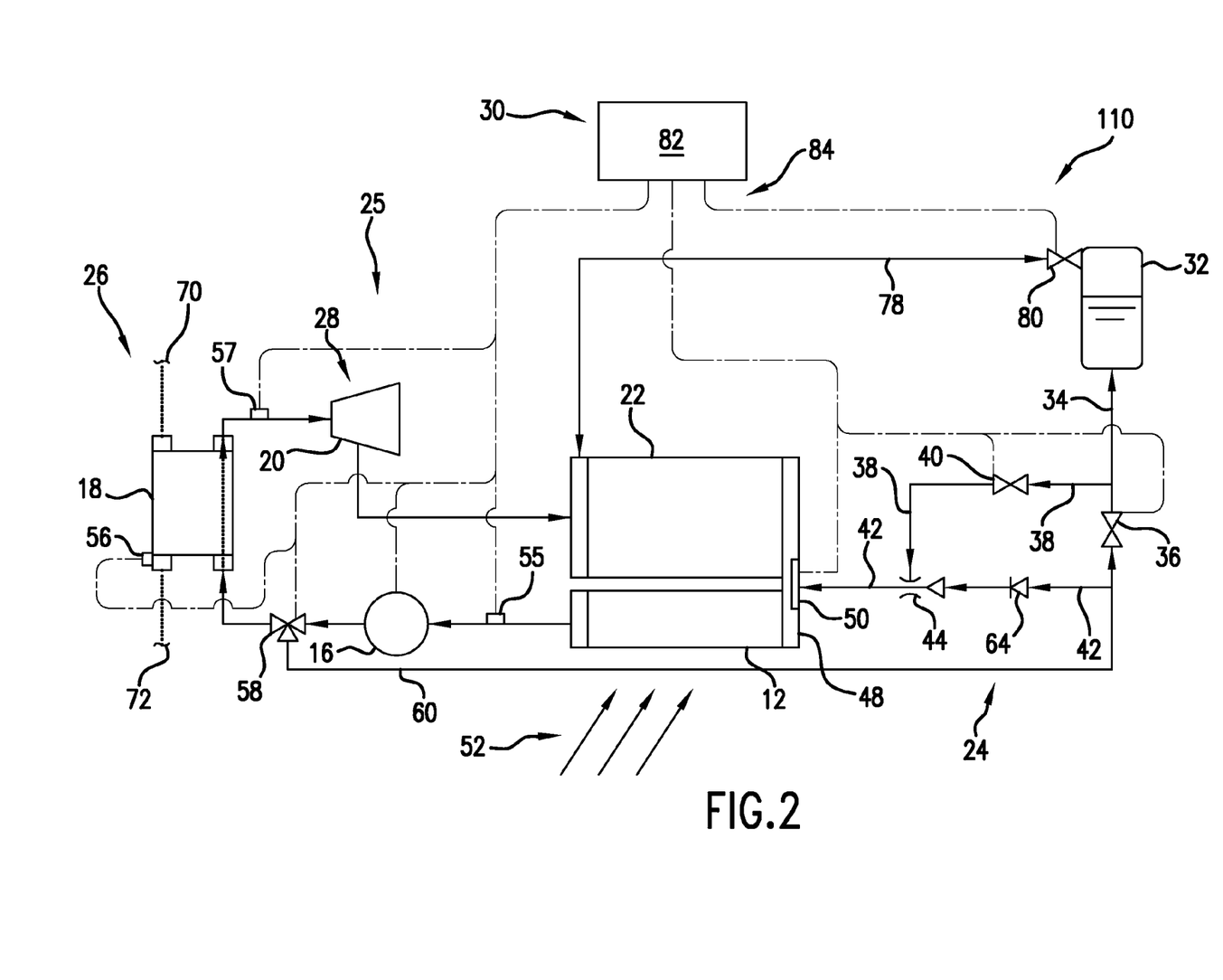
FIG. 2 is a WHR system in accordance with a first exemplary embodiment of the present disclosure.

FIG. 2 shows a first exemplary embodiment WHR system 110 of the present disclosure. Elements having the same number as elements in FIG. 1 function as described in FIG. 1. These elements are described in this embodiment only for the sake of clarity. WHR system 110 includes a fluid management system 24, which fluidly connects to a working fluid circuit 25, and a control system 30.

Working fluid circuit 25 includes condenser 22 and sub-cooler 12. Condenser 22 and sub-cooler 12 may be two separate fluidly connected components, they may be an integral unit or they may mount to a common base plate 48. Downstream from sub-cooler 12 and located along working fluid circuit 25 is feed pump 16. A temperature and pressure sensor 55 may be located along working fluid circuit 25 between sub-cooler 12 and pump 16. Downstream from feed pump 16 and located along working fluid circuit 25 are a heat exchange portion 26 and an energy conversion portion 28. Downstream from energy conversion portion 28 is condenser 22. Thus, working fluid circuit 25 forms a closed loop.

Heat exchange portion 26 includes heat exchanger 18 that is downstream from a heat source 70 and upstream from an exit location 72. A temperature sensor 56 may measure the temperature along the path from heat exchanger 18 to exit location 72.

Energy conversion portion 28 includes energy conversion device 20. Energy conversion device 20 of Rankine cycle working fluid circuit 25 is capable of producing additional work or transferring energy to another device or system. For example, energy conversion device 20 can be a turbine that rotates as a result of expanding working fluid vapor to provide additional work, which can be fed into the engine's driveline to supplement the engine's power either mechanically or electrically (e.g., by turning a generator), or it can be used to power electrical devices, parasitic or a storage battery (not shown). Alternatively, the energy conversion device can be used to transfer energy from one system to another system (e.g., to transfer heat energy from WHR system 110 to a fluid for a heating system). A temperature sensor 57 may be located along working fluid circuit 25 between heat exchanger portion 26 and energy conversion portion 28.

Fluid management system 24 includes a bypass valve 58 positioned between pump 16 and heat exchange portion 26. Bypass valve 58 may be any suitable type of valve capable of controlling the flow of fluid into working fluid circuit 25 and fluid management system 24, and more specifically, into a bypass passage 60 of fluid management system 24. For example, bypass valve 58 may be a three-way valve movable to a first position permitting flow of liquid working fluid downstream to heat exchanger portion 26 while blocking flow into bypass passage 60, a second position permitting fluid flow into bypass passage 60 while blocking fluid flow into working fluid circuit 25, and an intermediate position permitting some portion of fluid flow into each of working fluid circuit 25 and bypass passage 60 of fluid management system 24. The intermediate position may be variable to control the amount of fluid flow into each of working fluid circuit 25 and bypass passage 60 of fluid management system 24 to thereby control the proportion of the downstream flow between working fluid circuit 25 and fluid management system 24 based on the operating conditions of the system. Valve 58 could also be multiple two-way valves, with one valve positioned along the working fluid circuit 25 downstream from bypass passage 60 and one valve positioned along bypass passage 60 downstream from working fluid circuit 25.

Bypass conduit or passage 60 extends downstream from bypass valve 58 along fluid management system 24 to two branches or passages of fluid management system 24. A first branch 34 extends to a receiver 32. Located along branch 34 of fluid management system 24 is a receiver fill valve 36. A second branch 42 of fluid management system 24 extends to condenser 22 and sub-cooler 12. Positioned along this branch are a check valve 64 and an ejector 44. A connecting passage 38 of fluid management system 24 extends from first branch 34 in a location between receiver 32 and receiver fill valve 36 to ejector 44. A receiver drain valve 40 is positioned along connecting passage 38. A vent passage 78 connects working fluid circuit 25 to fluid management system 24. More specifically, vent passage 78 extends from an upper portion of condenser 22 to an upper portion of receiver 32 to permit bi-directional flow of vapor between condenser 22 and receiver 32, as will be described in more detail hereinbelow. A receiver vent valve 80, which may operate as a proportional valve movable to partial open/closed positions or may be modulated or cycled rapidly between positions, also called binary operation or modulation, may be positioned along vent passage 78.

Receiver 32 contains liquid working fluid having a fluid level. Sub-cooler 12 and condenser 22 also contain liquid working fluid having a fluid level. Receiver 32 has a position where the minimum level or surface of the liquid working fluid in receiver 32 is higher than the maximum level or surface of the liquid working fluid in condenser 22 and sub-cooler 12. Receiver 32 may be in a physical location that is higher than condenser 22 and sub-cooler 12.

Control system 30 may receive signals from various sensors positioned about WHR system 110 indicative of the condition of WHR system 110. For example, temperature and pressure sensor 55, temperature sensor 56, temperature sensor 57 and a fluid level sensor 50 positioned with condenser 22 and sub-cooler 12 may send signals to control system 30. Control system 30 may operate certain elements of WHR system 110. For example, control system 30 may operate receiver fill valve 36, receiver drain valve 40, bypass valve 58, and receiver vent valve 80. Such operation may be in response to signals received from the various sensors previously described or other sensors located in working fluid circuit 25 and fluid management system 24.

Control system 30 may include a control module 82 and a wiring harness 84. Control module 82, which may be a single processor, a distributed processor, an electronic equivalent of a processor, or any combination of the aforementioned elements, as well as software, electronic storage, fixed lookup tables and the like, connects to and may control certain components of WHR system 110. The connection to components of WHR system 110 may be through wire harness 84, though such connection may be by other means, including a wireless system. Control module 82 may be an electronic control unit (ECU) or electronic control module (ECM) that monitors the performance of an associated engine (not shown) and other components and conditions of a vehicle. Control module 82 may connect to and send signals to feed pump 16, receiver fill valve 36, receiver drain valve 40, bypass valve 58, and vent valve 80. Control module 82 may also connect to and receive signals from fluid level sensor 50, temperature and pressure sensor 55, temperature sensor 56, and temperature sensor 57. Control module 82 may interface with other sensors and elements to determine whether various components of WHR system 110 are operating successfully and to operate and control WHR system 110.

Applicants recognize the importance of controlling or regulating fluid inventory in the condenser, the sub-cooler, and the receiver of a WHR system to control low-side pressures and feed pump cavitation during engine operations while remaining cost effective. In addition, a liquid level increase in the condenser would displace and reduce the areas for vapor condensation and would raise system pressure, which in turn would increase fluid sub-cooling, a condition known to cause cavitation in a Rankine cycle WHR system feed pump. A Rankine cycle WHR system is also prone to overpressure during a hot engine shutdown event if the engine drives the feed pump. WHR system 110 and the other exemplary embodiments described hereinbelow operate in a manner that keeps these considerations productively balanced, as will be seen from the following description.

WHR system 110 may operate as follows. Feed pump 16 pulls liquid working fluid from sub-cooler 12. Feed pump 16, which may receive an operating signal from control module 82, pumps the liquid working fluid downstream to bypass valve 58. The liquid working fluid flows downstream from bypass valve 58 to heat exchange portion 26 and into bypass passage 60 of fluid management system 24.

Liquid working fluid enters heat exchanger 18 of heat exchange portion 26. A hot fluid, such as coolant, compressed air from a turbocharger, exhaust gas, EGR gas, lubricant, and other sources of waste heat, from heat source 70 flows through heat exchanger 18 to exit location 72. Heat transfers from the hot fluid to the liquid working fluid, causing the liquid working fluid to form a high-pressure vapor and cooling the hot fluid. The hot fluid departs heat exchanger 18 at exit location 72, which may be an exhaust system or pipe, an EGR system, or other location. The vaporized working fluid flows downstream from heat exchanger 18 to energy conversion device 20 of energy conversion portion 28. As the vaporized working fluid flows through energy conversion device 20, the pressure and the temperature of the vaporized working fluid decrease. The vaporized working fluid flows downstream from energy conversion device 20 to condenser 22. Condenser 22 as well as sub-cooler 12 may be cooled by ram air, cooling liquid or other cooling sources 52. The cooling of condenser 22 causes the vaporized working fluid to condense, returning the vaporized working fluid to a liquid. The liquid working fluid then flows through the force of gravity downstream to sub-cooler 12. Working fluid may receive additional cooling in sub-cooler 12.

Bypass valve 58, which may operate as a proportional valve movable to partial open/closed positions or may be modulated or cycled rapidly between positions, also called binary operation or modulation, is adjustable by signals received from control module 82. As noted hereinabove, bypass valve 58 may direct liquid working fluid into fluid management system 24, which increases or decreases flow through heat exchange portion 26 of working fluid circuit 25, which increases and decreases the flow of cool liquid working fluid through heat exchange portion 26 and thus through energy conversion portion 28. Decreased flow through working fluid circuit 25 can decrease cooling of hot fluid from heat source 70. Decreasing cooling of hot fluid from heat source 70 may lead to benefits for an associated engine (not shown). For example, an increase in the temperature of the hot fluid may aid in permitting an associated engine (not shown) to come to temperature more quickly, achieving efficient operation faster. An increase in the temperature of the hot fluid may also be desirable for other reasons, such as filter regeneration.

Fluid that enters bypass passage 60 of fluid management system 24 flows downstream. From bypass passage 60, the liquid working fluid may flow either through first branch 34 to receiver fill valve 36 or through second branch 42 to check valve 64. Control module 82 may control the opening and closing of receiver fill valve 36, which may operate as a proportional valve movable to partial open/closed positions or may be modulated or cycled rapidly between positions, also called binary operation or modulation. When receiver fill valve 36 is open, liquid working fluid flows downstream from receiver fill valve 36 to receiver 32. When receiver fill valve 36 is closed, liquid working fluid flows into second branch 42 to check valve 64, which may have an opening or cracking pressure of approximately 5 PSI. The opening or cracking pressure of check valve 64 prevents low bypass flow from opening check valve 64. Thus, low bypass flow is capable of rising through receiver fill valve 36 when receiver fill valve 36 is open to flow to receiver 32. When receiver fill valve 36 is closed, the liquid working fluid that flows through bypass passage 60 may flow through check valve 64 if the pressure of the liquid working fluid in bypass passage 60 exceeds the opening or cracking pressure of check valve 64. The liquid working fluid then flows downstream through ejector 44 to condenser 22 and sub-cooler 12.

If control module 82 commands receiver drain valve 40 to open, receiver fill valve 36 to close, and receiver vent valve 80 to open, then bypass fluid flow through check valve 64 and ejector 44 causes reduced pressure in connecting passage 38. Drain valve 40 may operate as a proportional valve movable to partial open/closed positions or may be modulated or cycled rapidly between positions, also called binary operation or modulation. The reduced pressure in connecting passage 38 causes liquid working fluid to flow from receiver 32 through drain valve 40 and then into ejector 44. The liquid working fluid joins the flow of liquid working fluid flowing through second branch 42 at ejector 44, flowing downstream to condenser 22 and sub-cooler 12, which increases or raises the level of fluid in condenser 22 and sub-cooler 12.

The level of the liquid working fluid inside condenser 22 and sub-cooler 12 affects sub-cooling of the liquid working fluid that flows downstream to feed pump 16. With respect to the level of the liquid working fluid in condenser 22 and sub-cooler 12, an increase in the level of the liquid working fluid increases sub-cooling. A decrease in the level of the liquid working fluid decreases sub-cooling. As the level of the liquid working fluid increases, the pressure in condenser 22 increases as the relative volume between condensing and sub-cooling shifts. The increased pressure of the liquid working fluid as it flows toward pump 16 provides benefits, which includes increasing the cavitation margin of pump 16 by increasing the working fluid sub-cooling (the degrees of temperature below the saturation temperature for the measured pressure), which assists pump 16 in maintaining prime, or the ability to move fluid. An increase in pressure in working fluid circuit 25 reduces the power from energy conversion device 20 because the pressure drop across energy conversion device 20 decreases, so the optimum level of the liquid working fluid in condenser 22 and sub-cooler 12 is when the level is as low as possible without causing feed pump 16 to cavitate.

Vent passage 78 and vent valve 80, which is physically near the top portion of receiver 32, allows pressure within receiver 32 of fluid management system 24 to be similar to pressure within condenser 22 of working fluid circuit 25 during normal operation. Vent passage 78 and vent valve 80 also allows vapor to enter or exit receiver 32 when liquid working fluid is transferred in and out of receiver 32. Vapor that may form within receiver 32 is able to travel through vent conduit 78 and vent valve 80 to condenser 22.

The level of liquid working fluid in condenser 22 and sub-cooler 12 may be set by fluid level sensor 50 or by monitoring the temperature and pressure of the liquid working fluid exiting sub-cooler 12 using sensors 55. For example, when the temperature and pressure signals from sensor 55 to control module 82 indicate that a sub-cooling temperature, Tsub-cool, which is equal to a saturation temperature, Tsaturation, minus a measured temperature, Tmeasured, is below a target range and cavitation may occur in feed pump 16, control module 82 may send signals to close receiver fill valve 36 and to open receiver drain valve 40 to increase or raise the level of liquid working fluid in condenser 22 and sub-cooler 12. Liquid working fluid from bypass passage 60 may assist in increasing the level of liquid working fluid in condenser 22 and sub-cooler 12, as has been described hereinabove. Tsaturation is a value established in control module 82 for a given pressure. Tmeasured is acquired from sensors 55.

When sub-cooling, Tsub-cooling, is too high or above a target level, control module 82 may command receiver fill valve 36 to open and receiver drain valve 40 to close, which allows liquid working fluid to flow from bypass passage 60 through check valve 64 into receiver 32. As previously noted, the cracking pressure of normally closed check valve 64 is such that it permits liquid working fluid to flow through receiver fill valve 36 even when pressure in bypass passage 60 is relatively low. Otherwise, check valve 64 might permit liquid working fluid to drain from receiver 32 into sub-cooler 12 when receiver fill valve 36 is open.

When sub-cooling, Tsub-cooling, is too low, control module 82 commands receiver drain valve 40 to open and receiver fill valve 36 to close, allowing liquid working fluid to flow through drain valve 40, through ejector 44 into sub-cooler and condenser 22. Ejector 44 acts like a Venturi in this situation. Liquid working fluid flowing through second branch 42 and through ejector 44 creates a vacuum pressure on connecting passage 38. This vacuum pressure pulls liquid working fluid from receiver 32 and connecting passage 38 into ejector 44, thus making use of the potential energy of the liquid working fluid from the bypass passage 60. The pressure of the combined fluid streams flowing through ejector 44 to condenser 22 and sub-cooler 12 is also increased.

If Tsub-cool is approximately at a target value, then any fluid traveling into fluid management system 24 from bypass valve 58 is routed directly through check valve 64 to condenser 22/sub-cooler 12, while receiver fill valve 36 and receiver drain valve 40 are closed by signals received control module 82.

Receiver vent valve 80 is normally open during operation of WHR system 110, as previously described. Upon shutdown of an associated engine, control module 82 commands receiver vent valve 80 to close, receiver fill valve 36 to close, and receiver drain valve 40 to open. If WHR system 110 is hot, the liquid working fluid in heat exchanger 18 continues to vaporize. This vapor continues to condense in condenser 22, causing condenser 22 to flood with liquid working fluid since feed pump 16 is not operating upon engine shutdown. Pressure increases in condenser 22 as less volume is available for vaporized working fluid to condense, which could lead to an overpressure condition. With receiver vent valve 80 closed, the increased pressure in condenser 22 forces liquid working fluid through ejector 44 into connecting passage 38, through open receiver drain valve 40, into first branch 34, and into receiver 32. By forcing liquid working fluid into receiver 32, condenser 22 does not flood and its pressure remains below the design pressure of heat exchanger 18, thus preventing an overpressure condition in condenser 22 and the other elements of working fluid circuit 25. Note that liquid working fluid is unable to flow from condenser 22 and sub-cooler 12 through check valve 64 because check valve 64 permits one-way operation only. Any fluid that attempts to flow through check valve 64 when the pressure on the downstream is higher than the upstream side forces check valve 64 closed.

Receiver vent valve 80 may operate as a proportional valve movable to partial open/closed positions or may be modulated or cycled rapidly between positions, also called binary operation or modulation, controlled by control module 82, to regulate the pressure of condenser 22 during operation of the Rankine cycle. As previously noted, temperature and pressure sensor 55 may send signals to control module 82. If control module 82 senses a transient condition leading to increased pressure in WHR system 110, then control module 82 may command receiver vent valve 80 to open or close. With receiver vent valve 80 closed, increased pressure forces liquid working fluid into receiver 32, through the previously described fluid path that includes receiver drain valve 40, equalizing pressure throughout WHR system 110. With receiver vent valve 80 open, pressure is able to increase throughout the system.

Control module 82 may also adjust the superheat temperature, Tsuperheat=Tmeasured−Tsaturation, of the vaporized working fluid. Tsaturation is derived from a pressure signal control module 82 receives from temperature and pressure sensor 57. Tmeasured is also a signal received from sensor 57. Tsuperheat has a target range. If Tsuperheat is lower than the target range, control module 82 may decrease the flow of liquid working fluid through working fluid circuit 25 by controlling bypass valve 58, reduced working fluid flow rate while at a constant waste heat input available increases the superheat. Control module 82 may also decrease sub-cooling. Control module 82 may also control the flow of waste heat to heat exchange portion 26 to increase heat transfer to the liquid working fluid.

If Tsuperheat is above a target range, control module 82 may increase the flow of working fluid through working fluid circuit 25 and may increase sub-cooling to decrease Tsuperheat. Control module 82 may also decrease the flow of waste heat through heat exchange portion 26 to decrease superheat until it reaches the target range.

Figure 3:
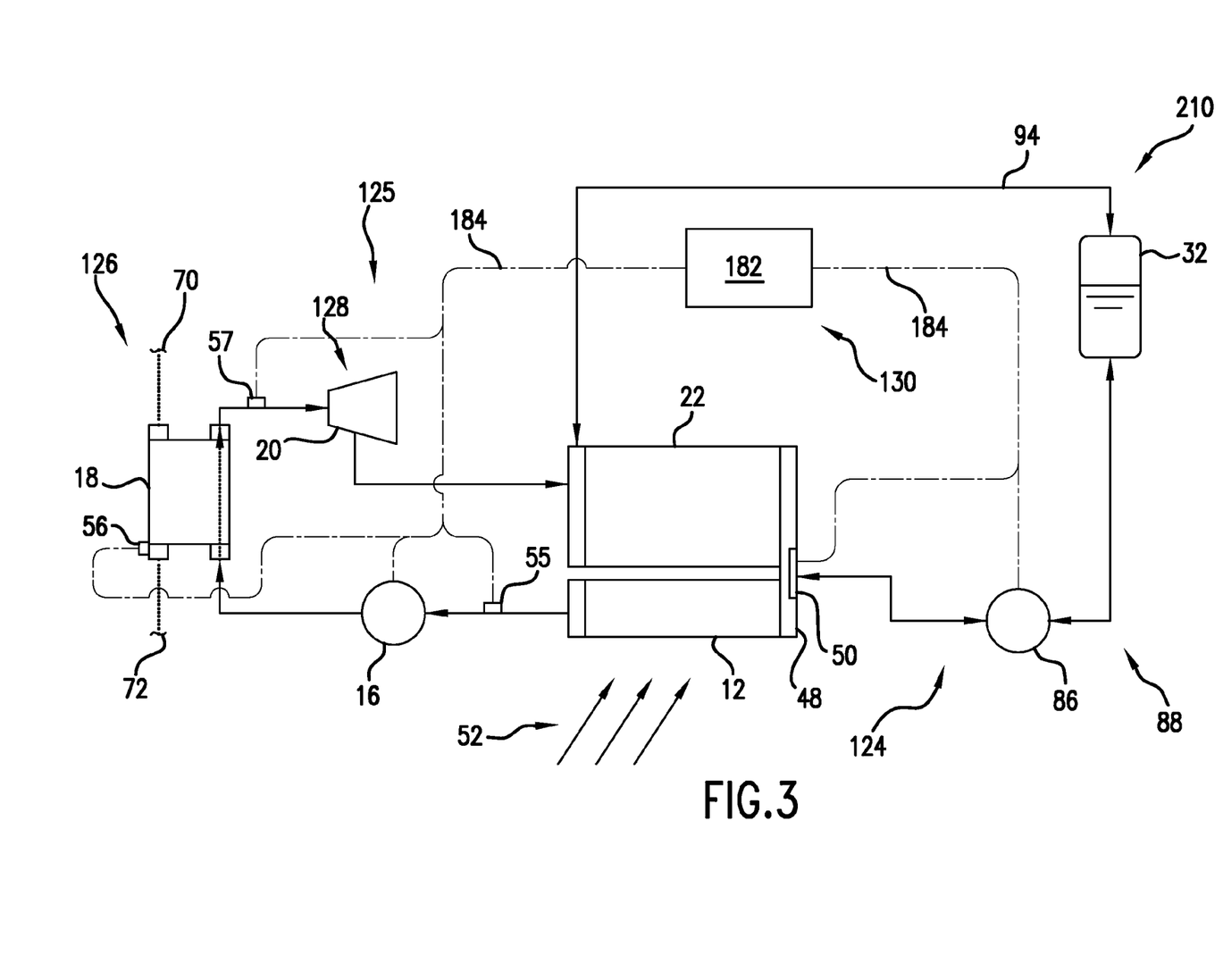
FIG. 3 is a WHR system in accordance with a second exemplary embodiment of the present disclosure.

FIG. 3 shows a second exemplary embodiment WHR system 210. Elements having the same item number as FIG. 1 and FIG. 2 function as described in FIGS. 1 and 2. These elements are described in this embodiment only for the sake of clarity. WHR system 210 includes a fluid management system 124, which connects to a working fluid circuit 125. A control system 130 may operate certain elements of WHR system 210.

Working fluid circuit 125 includes condenser 22, sub-cooler 12, pump 16, a heat exchange portion 126, and an energy conversion portion 128.

Sub-cooler 12 is downstream from condenser 22. Located along working fluid circuit 125 downstream from sub-cooler 12 is pump 16. Heat exchange portion 126 is located along working fluid circuit 125 downstream from pump 16. Energy conversion portion 128 is located along working fluid circuit 125 downstream from heat exchange portion 126 and upstream from condenser 22. Ram air or fluid 52 provides cooling to condenser 22 and sub-cooler 12. Both sub-cooler 12 and condenser 22 may mount on base plate 48.

Fluid management system 124 includes a transfer circuit 88 and receiver 32. Transfer circuit 88 is located along fluid management system 124 and connects receiver 32 to condenser 22 and sub-cooler 12. Located along transfer circuit 88 is a bi-directional pump 86, which may be an electric pump. Pump 86 is fluidly connected between receiver 32 and condenser 22/sub-cooler 12. A vent passage 94 connects working fluid circuit 125 to fluid management system 126. More specifically, vent passage 94 connects to a top portion of receiver 32 and to a top portion of condenser 22.

Feed pump 16 is prone to cavitation because the liquid working fluid can operate near the phase change point. During large heat input transients or abrupt changes in ambient air temperature to the condenser, the fluid in the receiver may boil, reducing the ability to pump the liquid working fluid, which reduces cooling in heat exchange portion 126. The operation of transfer circuit 88, and more specifically bi-directional transfer pump 86, assists in operating WHR system 210 near an optimal operating point that balances cavitation and cooling capability.

Raising or increasing the level of the liquid working fluid in condenser 22 and sub-cooler 12 increases the area and volume for sub-cooling, which increases sub-cooling and decreases the volume for condensation. The increase in the volume of liquid working fluid increases pressure in condenser 22, which decreases the likelihood of cavitation in pump 16 and improves the ability to pump the liquid working fluid. However, raising the level of the liquid working fluid also decreases the turbine power due to increased condenser pressure.

During a large engine transient or temperature change of ram air or cooling liquid 52, condenser 22 pressure may drop rapidly, causing the liquid working fluid in sub-cooler 12 to approach saturation, meaning that the liquid working fluid nears the phase change point where the liquid working fluid is close to vaporizing. Because the liquid working fluid is close to saturation, the action of feed pump 16 may cause the liquid working fluid to vaporize locally, causing cavitation in feed pump 16. Such cavitation is undesirable because it may cause damage to feed pump 16 as well as pressuring WHR system 210 in an undesirable location.

Control system 130 may include a control module 182 and a wiring harness 184. Control module 182, which may be a single processor, a distributed processor, an electronic equivalent of a processor, or any combination of the aforementioned elements, as well as software, electronic storage, fixed lookup tables and the like, connects to and may control certain components of WHR system 210. The connection to components of WHR system 210 may be through wire harness 184, though such connection may be by other means, including a wireless system. Control module 182 may be an electronic control unit (ECU) or electronic control module (ECM) that monitors the performance of an associated engine (not shown) and other components and conditions of a vehicle.

Control module 182 receives temperature and pressure signals from sensor 55, a temperature signal from sensor 56, a temperature and pressure signals from sensor 57, and a fluid level signal from fluid level sensor 50 that indicate the status of the liquid working fluid. For example, the temperature and pressure measured by sensor 55 may indicate that a sub-cooling temperature, Tsub-cool, which is equal to a saturation temperature, Tsaturation, minus a measured temperature, Tmeasured, is below a target range. Temperature sensor 56 may indicate a need to change cooling of fluid from heat source 70. Temperature sensor 57 may indicate a need to increase or decrease the superheat temperature of the vaporized working fluid.

To prevent undesirable cavitation, control module 182 may control transfer pump 86 of transfer circuit 88 to transfer liquid working fluid from receiver 32 into condenser 22 and sub-cooler 12. Vaporized working fluid is able to flow from condenser 22 through vent passage 94 toward receiver 32 to permit the liquid working fluid to flow from receiver 32. The pressure in condenser 22 increases with the increased level of the liquid working fluid and sub-cooling increases to the minimum required level, which moves the liquid working fluid in condenser 22 and sub-cooler 12 away from the saturation point.

Conditions in condenser 22 and sub-cooler 12 may also lead to an increase in condenser 22 pressure. For example, if the liquid working fluid level increases beyond an optimal level, power from energy conversion portion 128 or from energy conversion device 20 may fall below a useful or desirable level because the pressure differential across energy conversion device 20 decreases. As before, the pressure and temperature signal from sensor 55 and from fluid level sensor 50 may indicate that the level of the liquid working fluid is higher than desirable, leading to sub-cooling higher than a target level. In this circumstance, control module 182 may control transfer pump 86 of transfer circuit 88 to move liquid working fluid from condenser 22 and sub-cooler 12 to receiver 32. As liquid working fluid flows into receiver 32, vaporized working fluid flows from receiver 32 through vent conduit 92 into condenser 22, preventing undesirable pressurization of liquid working fluid in receiver 32. The result is that the level of the liquid working fluid in condenser 22 and sub-cooler 12 decreases, thereby decreasing the pressure of the vaporized working fluid in condenser 22, which increases the power from energy conversion device 20 since the pressure differential across energy conversion device 20 increases.

Figure 4:
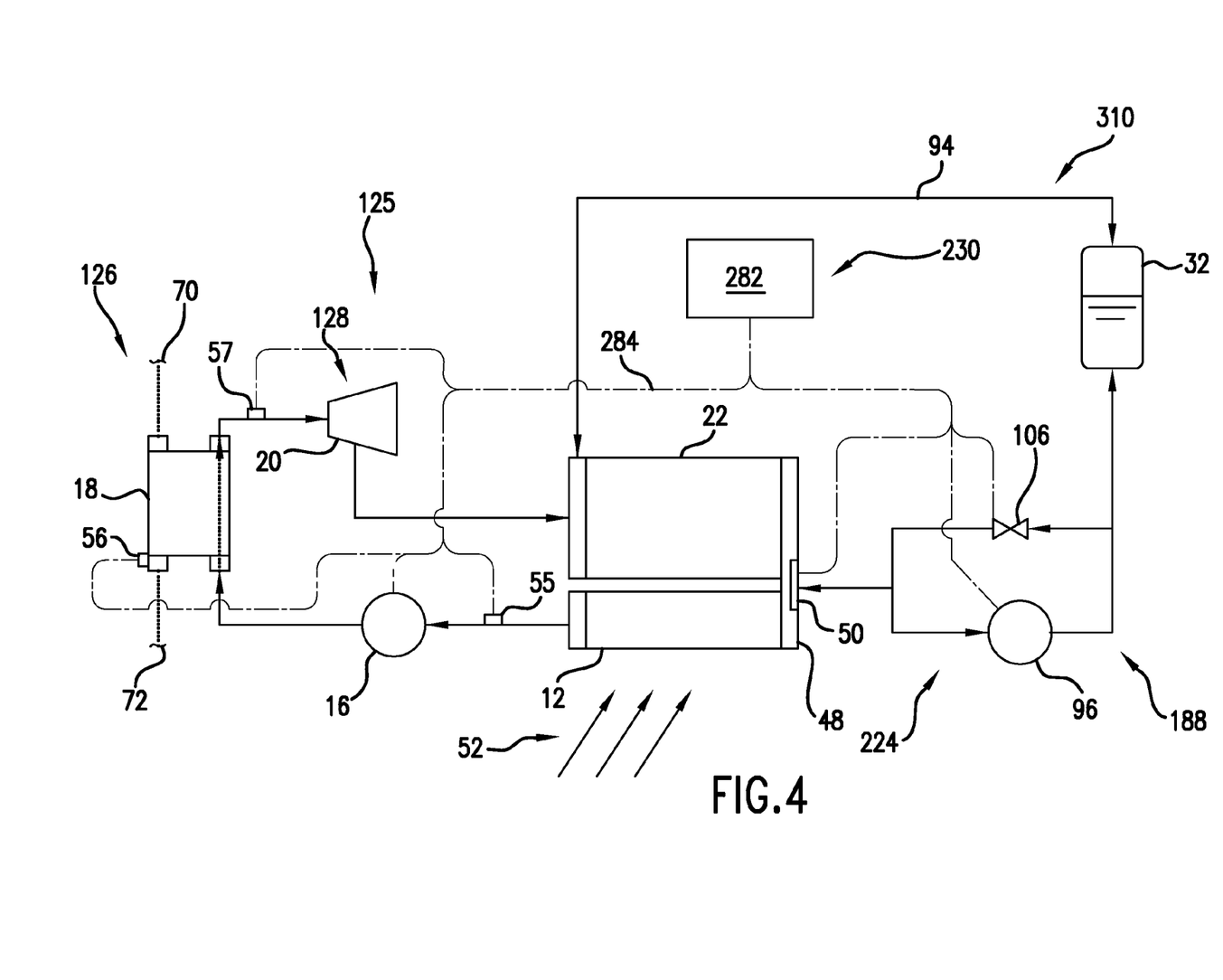
FIG. 4 is a WHR system in accordance with a third exemplary embodiment of the present disclosure.

FIG. 4 shows a third exemplary embodiment WHR system 310. Items have the same number as items in FIGS. 1, 2 and 3 operate in a manner similar to those items and descriptions of previously described items are for clarity only.

WHR system 310 includes a fluid management system 224, which connects to a working fluid circuit 125. A control system 230 may operate certain elements of WHR system 210.

WHR system 310 includes a fluid management system 224, which connects to working fluid circuit 125. Working fluid circuit 125 includes condenser 22, sub-cooler 12, pump 16, heat exchange portion 126, and energy conversion portion 128. Located along working fluid circuit 125 downstream from sub-cooler 12 is pump 16. Located along working fluid circuit 125 downstream from pump 16 is heat exchange portion 126. Downstream from heat exchange portion 126 and located along working fluid circuit 125 is energy conversion portion 128. Energy conversion portion 128 connects to an upstream side of condenser 22. Control system 230 may operate certain elements of WHR system 310. Ram air or fluid 52 provides cooling to condenser 22 and sub-cooler 12. Both sub-cooler 12 and condenser 22 may mount on base plate 48.

Fluid management system 224 includes receiver 32 and a transfer circuit 188. Transfer circuit 188 is located along fluid management system 224 and connects receiver 32 to condenser 22/sub-cooler 12. Transfer circuit 188 includes a transfer pump 96 and a drain valve 106. Transfer pump 96 is located along transfer circuit 188 between receiver 32 and condenser 22/sub-cooler 12. Drain valve 106 is also located along transfer circuit 188 between receiver 32 and condenser 22/sub-cooler 12 in a position parallel to transfer pump 96. Transfer pump 96 may be an electric pump. Vent passage 94 connects working fluid circuit 125 to fluid management system 126. More specifically, vent passage 94 connects to a top portion of receiver 32 and to a top portion of condenser 22.

Feed pump 16 is prone to cavitation because the liquid working fluid can operate near the phase change point. During large heat input transients or abrupt changes in ambient air temperature to the condenser, the fluid in the receiver may boil, reducing the ability to pump the liquid working fluid, which reduces cooling in heat exchange portion 126. The operation of transfer circuit 188 assists in operating WHR system 310 near an optimal operating point that balances cavitation and cooling capability.

Raising or increasing the level of the liquid working fluid in condenser 22 and sub-cooler 12 increases the area and volume for sub-cooling and decreases the volume for condensation. The increase in the volume of liquid working fluid increases sub-cooling. The increase in the volume of liquid working fluid decreases the likelihood of cavitation in pump 16 and improves the ability to pump the liquid working fluid. However, raising the level of the liquid working fluid also decreases power from energy conversion device 20 due to increased pressure in condenser 22, which decreases the pressure drop across energy conversion device 20.

During a large engine transient or temperature change of ram air or cooling liquid 52, the pressure in condenser 22 may drop rapidly, causing the liquid working fluid in sub-cooler 12 to approach saturation, meaning that the liquid working fluid nears the phase change point where the liquid working fluid is close to vaporizing. Because the liquid working fluid is close to saturation, the action of feed pump 16 may cause the liquid working fluid to vaporize locally, causing cavitation in feed pump 16. Such cavitation is undesirable because it may cause damage to feed pump 16 as well as pressurizing WHR system 210 in an undesirable location.

Control system 230 may include a control module 282 and a wiring harness 284. Control module 282, which may be a single processor, a distributed processor, an electronic equivalent of a processor, or any combination of the aforementioned elements, as well as software, electronic storage, fixed lookup tables and the like, connects to and may control certain components of WHR system 310. The connection to components of WHR system 310 may be through wire harness 284, though such connection may be by other means, including a wireless system. Control module 282 may be an electronic control unit (ECU) or electronic control module (ECM) that monitors the performance of an associated engine (not shown) and other components and conditions of a vehicle.

Control module 282 receives temperature and pressure signals from sensor 55, a temperature signal from sensor 56, a temperature and a pressure signal from sensor 57, and a fluid level from fluid level sensor 50 that indicate the status of the liquid working fluid. For example, the temperature and pressure measured by sensor 55 may indicate that a sub-cooling temperature, Tsub-cool, which is equal to a saturation temperature, Tsaturation, minus a measured temperature, Tmeasured, is below a target range. Temperature sensor 56 may indicate a need to change cooling of fluid from heat source 70. Temperature and pressure sensor 57 may indicate a need to increase or decrease the superheat temperature of vaporized working fluid.

To prevent undesirable cavitation, control module 282 may control drain valve 106 of transfer circuit 188 to transfer liquid working fluid from receiver 32 downstream into condenser 22 and sub-cooler 12. Drain valve 106 may operate as a proportional valve movable to partial open/closed positions or may be modulated or cycled rapidly between positions, also called binary operation or modulation. Vaporized working fluid is able to flow from condenser 22 through vent passage 94 toward receiver 32 to permit the liquid working fluid to flow from receiver 32. During transfer of liquid working fluid from receiver 32 to condenser 22/sub-cooler 12, control module 282 may command transfer pump 96 to be in an "off" or non-operating mode. The pressure in condenser 22 increases with the increased level of the liquid working fluid and sub-cooling increases to the minimum required level, which increases the sub-cooling of the liquid working fluid in condenser 22 and sub-cooler 12 toward a target range.

Conditions in condenser 22 and sub-cooler 12 may also lead to an increase in condenser 22 pressure, which increases sub-cooling. For example, if the liquid working fluid level increases beyond an optimal level, power from energy conversion portion 128 or from energy conversion device 20 may fall below a useful or desirable level because the pressure differential across energy conversion device 20 decreases. The pressure and temperature signal from sensor 55 and from fluid level sensor 50 may indicate that sub-cooling is higher than desirable. In this circumstance, control module 282 may control transfer pump 96 of transfer circuit 188 to move liquid working fluid from condenser 22/sub-cooler 12 downstream to receiver 32. Control module 282 closes drain valve 106 during the transfer of fluid from Condenser 22 and sub-cooler 12 to receiver 32. Vaporized working fluid flows from receiver 32 through vent passage 94 into condenser 22, preventing undesirable pressurization of liquid working fluid in receiver 32. The result is that the level of the liquid working fluid in condenser 22 and sub-cooler 12 decreases, thereby decreasing the pressure of the vaporized working fluid in condenser 22 and decreasing sub-cooling, which increases the power from energy conversion device 20 since the pressure differential across energy conversion device 20 increases.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. A waste heat recovery system for an internal combustion engine, comprising:
   a working fluid circuit containing a working fluid;
   a condenser positioned along the working fluid circuit and containing a liquid working fluid having a first fluid level;
   a heat exchanger positioned along the working fluid circuit downstream of the condenser;
   an energy conversion device positioned along the working fluid circuit between the heat exchanger and the condenser;
   a fluid management system including a receiver containing the liquid working fluid and a transfer circuit fluidly connecting the receiver and the condenser, wherein the liquid working fluid in the receiver has a second fluid level and wherein a minimum second fluid level is higher than a maximum first fluid level;
   a bi-directional pump positioned along the transfer circuit between the condenser and the receiver;
   a valve positioned along the transfer circuit between the condenser and the receiver in parallel to the pump;
   at least one sensor adapted to measure a condition of the working fluid circuit; and
   a control module configured to receive the condition signal from the at least one sensor to generate a pump control signal and a valve control signal based on the condition signal to control operation of the bi-directional pump and the valve to transfer liquid working fluid between the receiver and the condenser to change the first fluid level.

2. The waste heat recovery system of claim 1, wherein the control module is configured to control the valve to a closed position and is configured to control the pump to transfer liquid working fluid from the condenser to the receiver to lower the first fluid level in response to receipt by the control module of a detection signal indicating that the first fluid level is higher than a target level.

3. The waste heat recovery system of claim 1, wherein the control module is configured to control the valve to transfer liquid working fluid from the receiver to the condenser to raise the first fluid level and is configured to control the pump to a non-operating mode in response to receipt by the control module of a detection signal indicating that the first fluid level is lower than a target level.

4. The waste heat recovery system of claim 1, wherein the at least one sensor is a pressure sensor.

5. The waste heat recovery system of claim 1, wherein the at least one sensor is a fluid level sensor.

6. The waste heat recovery system of claim 1, wherein the at least one sensor is a temperature sensor.

7. The waste heat recovery system of claim 1, wherein the receiver is physically positioned higher than the condenser.

8. The waste heat recovery system of claim 1, wherein the condenser includes a sub-cooler.

9. A waste heat recovery system for an internal combustion engine, comprising:
   a working fluid circuit containing a working fluid;
   a condenser positioned along the working fluid circuit and containing a liquid working fluid having a first fluid level;
   a pump positioned along the working fluid circuit downstream of the condenser
   a heat exchanger positioned along the working fluid circuit downstream of the pump;
   an energy conversion device positioned along the working fluid circuit between the heat exchanger and the condenser;
   a fluid management system including at least one first valve positioned between the pump and the heat exchanger;
   a receiver containing the liquid working fluid, the receiver positioned along the fluid management system downstream from the at least one first valve via a bypass passage, wherein the liquid working fluid in the receiver has a second fluid level and wherein a minimum second fluid level is higher than a maximum first fluid level;
   at least one sensor adapted to measure a condition of the working fluid circuit; and
   a control module configured to receive the condition signal from the at least one sensor and configured to generate a pump control signal based on the condition signal to control operation of the pump to transfer liquid working fluid between the receiver and the condenser to change the first fluid level, the control module further configured to generate valve control signals to cause the at least one first valve to
   a) block the heat exchanger and permit flow of the liquid working fluid to the receiver,
   b) block the receiver and permit flow of the liquid working fluid to the heat exchanger, and
   c) permit flow of a first portion of the liquid working fluid to the heat exchanger and a second portion of the liquid working fluid to the receiver.

10. The waste heat recovery system of claim 9, wherein the control module is configured to control the pump and the at least one first valve to transfer liquid working fluid from the condenser to the receiver to lower the first fluid level in response to receipt by the control module of a detection signal indicating that the first fluid level is higher than a target level.

11. The waste heat recovery system of claim 9, further comprising at least one second valve positioned between the condenser and the receiver wherein the control module is further configured to control the pump, the at least one first valve and the at least one second valve to transfer liquid working fluid from the receiver to the condenser to raise the first fluid level in response to receipt by the control module of a detection signal indicating that the first fluid level is lower than a target level.

12. The waste heat recovery system of claim 9, wherein the at least one sensor is a pressure sensor.

13. The waste heat recovery system of claim 9, wherein the at least one sensor is a fluid level sensor.

14. The waste heat recovery system of claim 9, wherein the at least one sensor is a temperature sensor.

15. The waste heat recovery system of claim 9, wherein the receiver is physically positioned higher than the condenser.

16. The waste heat recovery system of claim 9, wherein the condenser includes a sub-cooler.

17. A waste heat recovery system for an internal combustion engine, comprising:
a working fluid circuit containing a working fluid;
a condenser positioned along the working fluid circuit and containing a liquid working fluid having a first fluid level;
a pump positioned along the working fluid circuit downstream of the condenser;
a heat exchanger positioned along the working fluid circuit downstream of the pump;
an energy conversion device positioned along the working fluid circuit between the heat exchanger and the condenser;
a fluid management system including a bypass valve positioned between the pump and the heat exchanger;
a receiver containing the liquid working fluid positioned along the fluid management system downstream from the bypass valve, wherein the liquid working fluid in the receiver has a second fluid level and wherein a minimum second fluid level is higher than a maximum first fluid level;
a receiver fill valve positioned along the fluid management system between the bypass valve and the receiver;
a fluid branch extending along the fluid management system from a location between the bypass valve and the receiver fill valve to the condenser;
a check valve having a cracking pressure and permitting flow only toward the condenser positioned along the fluid branch;
an ejector positioned along the fluid branch between the check valve and the condenser;
a connecting passage extending along the fluid management system from a position between the receiver fill valve and the receiver to the ejector;
a receiver drain valve positioned along the connecting passage;
at least one sensor adapted to measure a condition of the working fluid circuit; and
a control module configured to receive the signal from the at least one sensor to generate at least one valve control signal based on the condition signal to control operation of one or more of the bypass valve, the receiver fill valve and the receiver drain valve to transfer liquid working fluid between the receiver and the condenser to change the first fluid level.

18. The waste heat recovery system of claim 17, wherein the the control module is configured to control the bypass valve and the receiver fill valve to cause the liquid working fluid to flow to the receiver, and the control module is configured to simultaneously cause the receiver drain valve to close.

19. The waste heat recovery system of claim 17, wherein the control module is configured to control the bypass valve, cause the receiver fill valve to close, and cause the receiver drain valve to open to transfer the liquid working fluid from the receiver to the condenser.

20. The waste heat recovery system of claim 17, wherein the at least one sensor is a pressure sensor.

21. The waste heat recovery system of claim 17, wherein the at least one sensor is a fluid level sensor.

22. The waste heat recovery system of claim 17, wherein the at least one sensor is a temperature sensor.

23. The waste heat recovery system of claim 17, wherein the receiver is physically positioned higher than the condenser.

24. The waste heat recovery system of claim 17, wherein the condenser includes a sub-cooler.

25. The waste heat recovery system of claim 17, further comprising a vent passage connecting a top portion of the condenser to a top portion of the receiver, the vent passage configured to permit a vaporized working fluid to flow from the condenser to the receiver.

* * * * *